E. SEVERSON.
TWINE DIPPING ATTACHMENT FOR SELF BINDERS.
APPLICATION FILED AUG. 25, 1919.

1,329,681. Patented Feb. 3, 1920.

INVENTOR:
EDWARD SEVERSON.
BY Whiteley and Ruckman
HIS ATTORNEYS.

UNITED STATES PATENT OFFICE.

EDWARD SEVERSON, OF HUNTER, NORTH DAKOTA.

TWINE-DIPPING ATTACHMENT FOR SELF-BINDERS.

1,329,681.    Specification of Letters Patent.    Patented Feb. 3, 1920.

Application filed August 25, 1919. Serial No. 319,790.

*To all whom it may concern:*

Be it known that I, EDWARD SEVERSON, a citizen of the United States, residing at Hunter, in the county of Cass and State of North Dakota, have invented certain new and useful Improvements in Twine-Dipping Attachments for Self-Binders, of which the following is a specification.

My invention relates to twine dipping attachment for self-binders and an object is to provide an efficient device for subjecting binder twine to the action of a suitable liquid which will prevent the twine from being chewed by insects after the grain has been tied into bundles. An object in particular is to provide a receptacle for a twine treating liquid to be placed between the twine box and the needle of the binder mechanism and so constructed and arranged that the twine may be properly positioned in the receptacle by the operator without liability of his hands coming in contact with the liquid. A further object is to provide a tension device for the twine which will also act to squeeze out surplus liquid carried by the twine and cause this surplus to drop back into the receptacle.

The full objects and advantages of my invention will appear in connection with the detailed description thereof and the novel features embodied in my inventive idea will be particularly pointed out in the claims.

Referring to the accompanying drawings which illustrate the application of my invention in one form—

Figure 1:
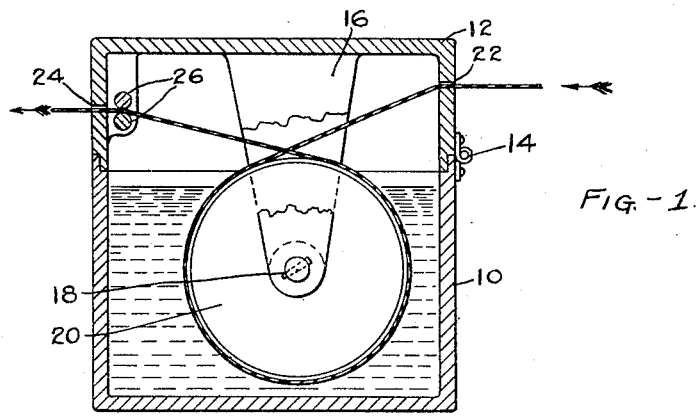
Figure 2:
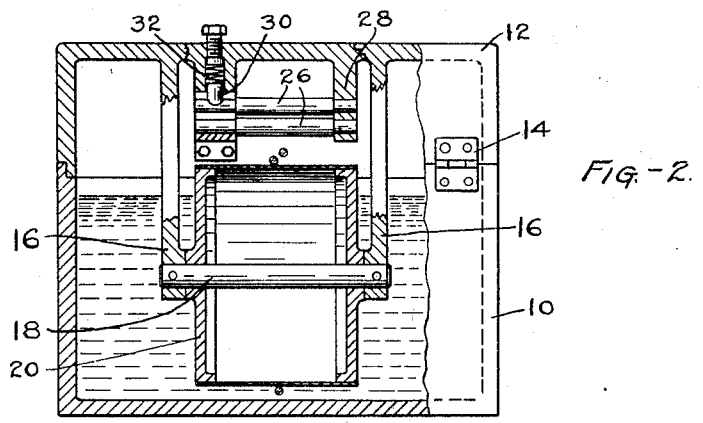
Figure 3:
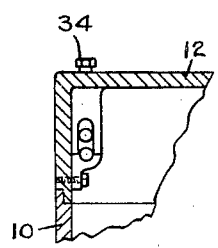

Figure 1 is a view in section transversely of the receptacle. Fig. 2 is a view in section longitudinally of the receptacle. Fig. 3 is a detail view.

Referring to the particular construction shown in the drawings, 10 designates a suitable receptacle having a cover 12 attached thereto by hinges 14, the meeting edges of the cover and receptacle being provided with overlapping portions to make a tight joint. The cover is provided with a pair of hangers 16, in the lower ends of which is mounted a shaft 18 for a roller 20 of relatively large size. The cover is provided with a hole 22 for passage of the twine into the receptacle and a hole 24 for the twine to pass out of the receptacle. Adjacent the hole 24 and inside the cover are supported a pair of tension rollers 26 which are rotatably mounted in lugs 28 and 30 attached to the cover. The rollers may be caused to engage each other more or less by means of a spring 32 and an adjusting screw 34 in the usual manner in order to vary the tension.

The operation and advantages of my invention will be readily understood from the foregoing description. In order to position the twine in the device the cover is lifted and the twine, as it comes from the twine box on the binder is passed through the hole 22 and after being laid around the roller 20 is passed between the rollers 26 and out of the hole 24 from which it goes to the needle. On account of the roller 20 being out of the liquid at this time all danger of getting the liquid on the hands is avoided and when the cover is closed the liquid is prevented from splashing out of the receptacle. The rollers 26 not only serve as tension rollers but also squeeze surplus liquid from the twine so that this surplus drops back into the receptacle. By making the roller 20 of comparatively large size the twine passes readily into and out of the receptacle.

I claim:

1. A twine dipping attachment for self binders comprising a receptacle for a twine treating liquid, a cover for said receptacle, hangers attached to the inside of said cover, and a comparatively large roller rotatably supported by said hangers and around which the twine passes as it enters and leaves said receptacle.

2. A twine dipping attachment for self binders comprising a receptacle for a twine treating liquid, a cover for said receptacle, hangers attached to the inside of said cover, and a comparatively large roller rotatably supported by said hangers, said cover being provided with holes at the opposite sides whereby twine passes into said receptacle around said roller and out of said receptacle.

3. A twine dipping attachment for self binders comprising a receptacle for a twine treating liquid, a cover hinged to said receptacle, the adjacent edges of said cover and receptacle having overlapping portions, hangers attached to the inside of cover, and a comparatively large roller rotatably supported by said hangers, said cover being provided with holes at the opposite sides whereby twine passes into said receptacle around said roller and out of said receptacle.

4. A twine dipping attachment for self binders comprising a receptacle for a twine treating liquid, a cover for said receptacle, hangers attached to the inside of said cover, a comparatively large roller rotatably supported by said hangers, said cover being provided with holes at the opposite sides whereby the twine passes into said receptacle, around said roller, and out of said receptacle, and a pair of small tension rollers mounted inside of said cover adjacent the exit hole.

In testimony whereof I hereunto affix my signature.

EDWARD SEVERSON.